(12) United States Patent
Jo et al.

(10) Patent No.: US 9,606,382 B2
(45) Date of Patent: Mar. 28, 2017

(54) DISPLAY WITH SEGMENTED COMMON VOLTAGE PATHS AND COMMON VOLTAGE COMPENSATION CIRCUITS

(71) Applicant: Apple Inc., Cupertino, CA (US)

(72) Inventors: Young-Jik Jo, Santa Clara, CA (US); Chun-Yao Huang, Cupertino, CA (US); Hao-Lin Chiu, Campbell, CA (US); Kwang Soon Park, Cupertino, CA (US); Shih Chang Chang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 14 days.

(21) Appl. No.: 14/712,311

(22) Filed: May 14, 2015

(65) Prior Publication Data

US 2016/0334658 A1 Nov. 17, 2016

(51) Int. Cl.
*G09G 3/34* (2006.01)
*G02F 1/133* (2006.01)
*G02F 1/1343* (2006.01)

(52) U.S. Cl.
CPC .... *G02F 1/13306* (2013.01); *G02F 1/134336* (2013.01)

(58) Field of Classification Search
CPC ... G09G 3/346; G09G 3/2022; G02B 26/0841
See application file for complete search history.

(56) References Cited

U.S. PATENT DOCUMENTS

| 7,646,444 | B2 * | 1/2010 | Kim | G02F 1/136213 257/59 |
|---|---|---|---|---|
| 8,228,287 | B2 | 7/2012 | Jaehun | |
| 8,711,302 | B2 | 4/2014 | Kim | |
| 8,941,795 | B2 | 1/2015 | Garelli et al. | |
| 8,952,872 | B2 | 2/2015 | Yoon et al. | |
| 2010/0110058 | A1 * | 5/2010 | Moh | G09G 3/3655 345/211 |
| 2012/0086661 | A1 * | 4/2012 | Shi | G06F 3/041 345/173 |
| 2014/0028535 | A1 * | 1/2014 | Min | G09G 3/18 345/87 |
| 2015/0054809 | A1 * | 2/2015 | Lim | G09G 3/3696 345/211 |

\* cited by examiner

*Primary Examiner* — Charles Hicks
(74) *Attorney, Agent, or Firm* — Treyz Law Group, P.C.; G. Victor Treyz; Zachary D. Hadd

(57) ABSTRACT

A display has an array of pixels controlled by display driver circuitry. Gate driver circuitry supplies gate line signals to rows of the pixels. The pixels may be liquid crystal display pixels. Each pixel may have a common electrode voltage terminal. The display may have a transparent conductive film that forms a common electrode voltage layer that overlaps that array and that is shorted to the common electrode voltage terminals of the pixels. Metal common electrode voltage lines may run across the transparent conductive film to reduce resistance. Metal common electrode voltage paths that are coupled to the metal common electrode voltage lines may run along the left and right edge of the display. Common electrode voltage compensation circuits may receive feedback from the metal common electrode voltage paths. There may be two or more common electrode voltage compensation circuits for both the left and right edges of the display.

20 Claims, 7 Drawing Sheets

DISPLAY WITH SEGMENTED COMMON VOLTAGE PATHS AND COMMON VOLTAGE COMPENSATION CIRCUITS

BACKGROUND

This relates generally to electronic devices, and, more particularly, to electronic devices with displays.

Electronic devices such as cellular telephones, computers, and other devices contain displays. A display includes an array of pixels for displaying images to a user. Display driver circuitry such as source line driver circuitry may supply data signals to the array of pixels. Gate line driver circuitry in the display driver circuitry can be used to assert a gate line signal on each row of pixels in the display in sequence to load data into the pixels.

A common electrode voltage layer may be used to distribute a common electrode voltage (Vcom) to the pixels in the array. The common electrode voltage may be formed from a transparent conductive film that covers the array of pixels. Due to overlap between the data lines and the common electrode voltage layer, there may be a non-negligible amount of capacitance between the data lines and the common voltage electrode. This capacitance gives rise to capacitive coupling between the data lines and the common electrode voltage layer. During operation of the display, capacitive coupling can lead to undesired ripple in the Vcom voltage.

To avoid excessive Vcom ripple, which can interfere with display operation, displays use Vcom compensation circuitry. A Vcom compensation circuit for a display includes an op-amp based control circuit. A feedback path provides a sample of the current Vcom voltage value from the Vcom electrode to one terminal of the op-amp. A reference Vcom voltage is applied to another terminal of the op-amp. The op-amp circuit supplies a Vcom voltage output to the Vcom electrode that maintains the Vcom electrode at the desired voltage (i.e., the reference voltage).

The effectiveness of conventional Vcom compensation circuitry is limited by the speed with which the op-amp based control circuit can adjust the Vcom electrode voltage. In conventional displays, control circuit response time is limited, which may adversely affect compensation performance.

It would therefore be desirable to be able to provide a display with improved common voltage compensation circuitry.

SUMMARY

A display may have an array of pixels controlled by display driver circuitry. The display driver circuitry may supply data on data lines to columns of the pixels. Gate driver circuitry in the display driver circuitry may be used to supply gate line signals to rows of the pixels.

The pixels may be liquid crystal display pixels. Each pixel may have a common electrode voltage terminal. The display may have a transparent conductive film that forms a common electrode voltage layer that overlaps that array and that is shorted to the common electrode voltage terminals of the pixels.

Metal common electrode voltage lines may run across the transparent conductive film to reduce electrode resistance. The metal common electrode voltage lines may run parallel to the gates lines. There may be a metal common electrode voltage line for each row of pixels.

Metal common electrode voltage paths may run along one or more edges of the display. For example, metal common voltage paths may run along respective left and right edges of the display. The metal common electrode voltage paths may be connected to the metal common electrode voltage lines and may help distribute a desired common electrode voltage to the common electrode voltage layer.

Common voltage compensation circuits may be used to maintain the metal common electrode voltage paths and therefore the common electrode voltage layer at a desired common electrode voltage level. The common electrode voltage compensation circuits may be based on operational amplifier control circuits. Each control circuit may receive feedback from the metal common electrode voltage paths. There may be two or more common electrode voltage compensation circuits for left edge of the display and two or more common electrode voltage compensation circuits for the right edge of the display. By providing multiple compensation circuits each of which drives a common electrode voltage output onto a different respective segment of one of the metal common electrode voltage paths, loading may be reduced and response times may be enhanced.

DETAILED DESCRIPTION

Figure 1:
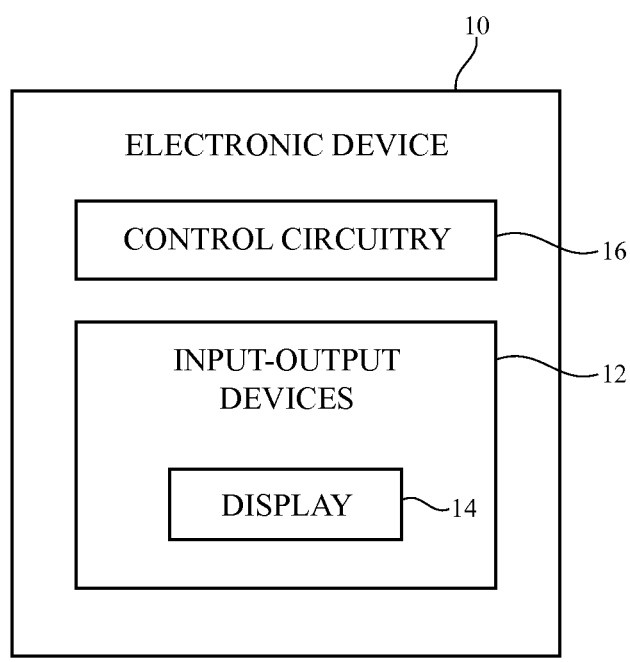
FIG. 1 is a schematic diagram of an illustrative electronic device having a display in accordance with an embodiment.

An illustrative electronic device of the type that may be provided with a display is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14 using an array of pixels in display 14.

Device 10 may be a tablet computer, laptop computer, a desktop computer, a display, a cellular telephone, a media player, a wristwatch device or other wearable electronic equipment, or other suitable electronic device.

Display 14 may be an organic light-emitting diode display, a liquid crystal display, or a display based on other types of display technology. Configurations in which display 14 is a liquid crystal display may sometimes be described herein as an example.

Display 14 may have a rectangular shape (i.e., display 14 may have a rectangular footprint and four edges that runs around the rectangular footprint) or may have other suitable shapes. Display 14 may be planar or may have a curved profile.

Figure 2:
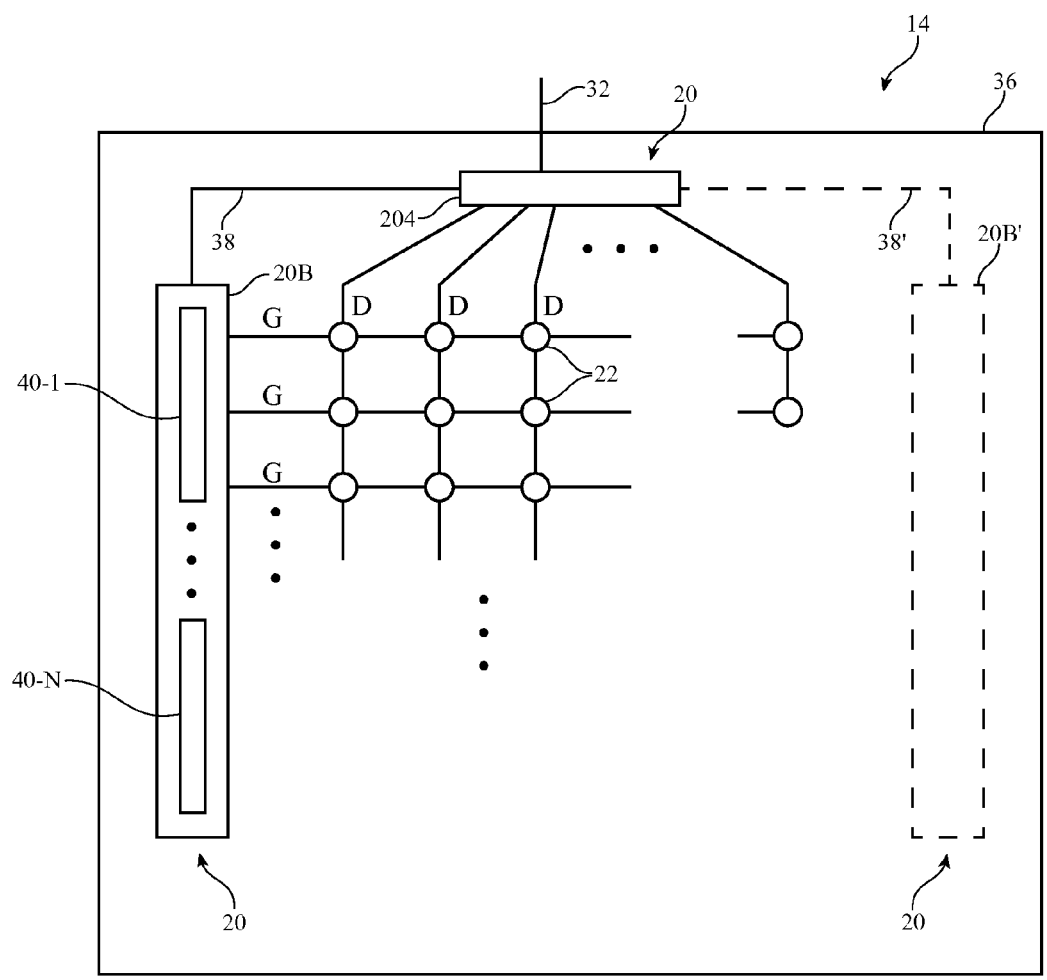
FIG. 2 is a top view of an illustrative display in an electronic device in accordance with an embodiment.

A top view of a portion of display 14 is shown in FIG. 2. As shown in FIG. 2, display 14 may have an array of pixels 22 formed from substrate structures such as substrate 36. Substrates such as substrate 36 may be formed from glass, metal, plastic, ceramic, or other substrate materials. Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). In organic light-emitting diode displays, pixels 22 contain respective light-emitting diodes and pixel circuits that control the application of current to the light-emitting diodes. In liquid crystal displays, pixels 22 contain pixel circuits that control the application of signals to pixel electrodes that are used for applying controlled amounts of electric field to pixel-sized portions of a liquid crystal layer. The pixel circuits in pixels 22 may contain transistors having gates that are controlled by gate line signals on gate lines G.

Display driver circuitry 20 may be used to control the operation of pixels 22. Display driver circuitry 20 may be formed from integrated circuits, thin-film transistor circuits, or other suitable circuitry. Thin-film transistor circuitry may be formed from polysilicon thin-film transistors, semiconducting-oxide thin-film transistors such as indium gallium zinc oxide transistors, or thin-film transistors formed from other semiconductors. Pixels 22 may have color filter elements of different colors (e.g., red, green, and blue) to provide display 14 with the ability to display color images.

Display driver circuitry 20 may include display driver circuits such as display driver circuit 20A and gate driver circuitry 20B. Display driver circuit 20A may be formed from one or more integrated circuits and/or thin-film transistor circuitry. Gate driver circuitry 20B may be formed from integrated circuits (e.g., gate driver integrated circuits 40-1) or may be thin-film "gate-on-array" circuitry. Display driver circuit 20A of FIG. 2 may contain communications circuitry for communicating with system control circuitry such as control circuitry 16 of FIG. 1 over path 32. Path 32 may be formed from traces on a flexible printed circuit or other conductive lines. During operation, the control circuitry (e.g., control circuitry 16 of FIG. 1) may supply circuit 20A with information on images to be displayed on display 14.

To display the images on display pixels 22, display driver circuitry 20A may supply image data to data lines D while issuing clock signals and other control signals such as a gate start pulse GSP and clock signal CLK to supporting display driver circuitry such as gate driver circuitry 20B over path 38. Circuitry 20A may supply clock signals and other control signals to gate driver circuitry 20B on one or both edges of display 14 (see, e.g., path 38' and gate driver circuitry 20B' on the right-hand side of display 14 in the example of FIG. 2).

In response to the control signal received on path 38, gate driver circuitry 20B may produce gate line signals on gate lines G. The gate lines signal on each gate line G may be used for controlling the pixels 22 of a respective row of the array of pixels 22 in display 14 (e.g., to turn on transistors in pixels 22 when loading data from the data lines D into pixel storage capacitors in those pixels). During operation, frames of image data may be displayed by asserting a gate signal on each gate line G in the display in sequence. Shift register circuitry (e.g., a chain of registers) in gate driver circuitry 20B may be used in controlling the gate line signals.

Multiple integrated circuits such as illustrative gate driver integrated circuits 40-1 . . . 40-N of FIG. 2 may be used in supplying gate signals G. The registers in each gate driver integrated circuit may be connected in a chain to form a shift register for that gate driver integrated circuit. The output of the last register in the shift register of each gate driver integrated circuit may be coupled to the input of the next gate driver integrated circuit in circuitry 20B to form a shift register that spans all of the gate lines in display 14.

Figure 3:
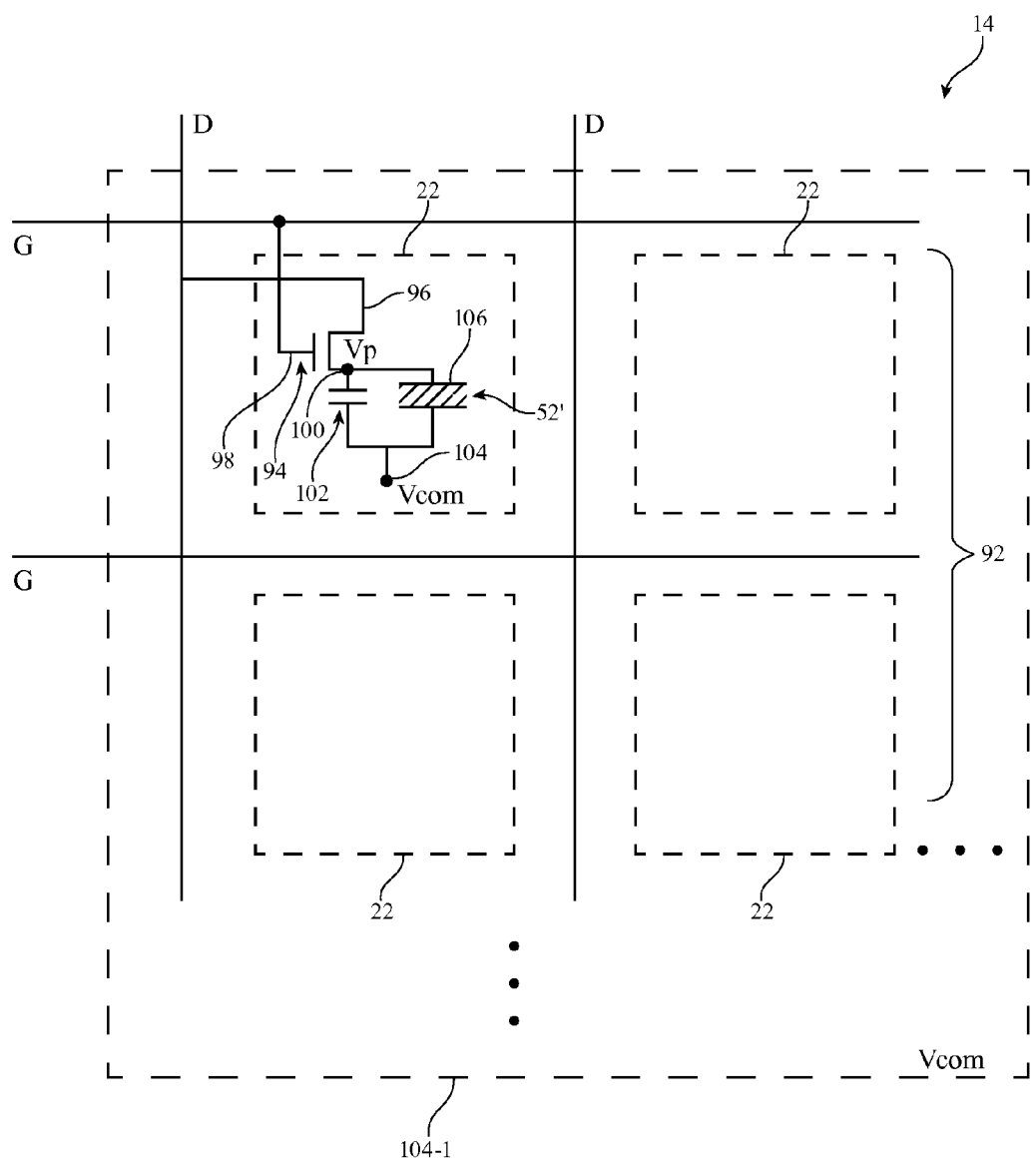
FIG. 3 is a circuit diagram of a portion of an array of pixels in a display in accordance with an embodiment.

As shown in FIG. 3, display 14 may include an array of pixels 22 such as pixel array 92. Pixels 22 in pixel array 92 may contain thin-film transistor circuitry (e.g., polysilicon transistor circuitry, amorphous silicon transistor circuitry, semiconducting-oxide transistor circuitry such as indium gallium zinc oxide transistor circuitry, other silicon or semiconducting-oxide transistor circuitry, etc.) and associated structures for producing electric fields across a liquid crystal layer in display 14. Each liquid crystal display pixel may have one or more thin-film transistors. For example, each pixel may have a respective thin-film transistor such as thin-film transistor 94 to control the application of electric fields to a respective pixel-sized portion 52' of a liquid crystal layer in display 14.

Gate driver circuitry 20 may be used to generate gate signals on gate lines G that control transistors such as transistor 94. The data line signals on data lines D in pixel array 92 carry analog image data (e.g., voltages with magnitudes representing pixel brightness levels). During the process of displaying images on display 14, a display driver integrated circuit or other circuitry may receive digital data from control circuitry and may produce corresponding analog data signals. The analog data signals may be demultiplexed and provided to data lines D.

The data line signals on data lines D are distributed to the columns of pixels 22 in pixel array 92. Gate line signals on gate lines G are provided to the rows of pixels 22 in pixel array 92 by associated gate driver circuitry.

The circuitry of display 14 may be formed from conductive structures (e.g., metal lines and/or structures formed from transparent conductive materials such as indium tin oxide or indium zinc oxide) and may include transistors such as transistor 94 of FIG. 3 that are fabricated on the thin-film transistor substrate layer of display 14. The thin-film transistors may be, for example, silicon thin-film transistors or semiconducting-oxide thin-film transistors.

As shown in FIG. 3, pixels such as pixel 22 may be located at the intersection of each gate line G and data line D in array 92. A data signal on each data line D may be supplied to terminal 96 from one of data lines D. Thin-film transistor 94 (e.g., a thin-film polysilicon transistor, an amorphous silicon transistor, or an oxide transistor such as a transistor formed from a semiconducting oxide such as indium gallium zinc oxide) may have a gate terminal such as gate 98 that receives gate line control signals on gate line G. When a gate line control signal is asserted, transistor 94 will be turned on and the data signal at terminal 96 will be passed to node 100 as pixel voltage Vp. Data for display 14 may be displayed in frames. Following assertion of the gate line signal in each row to pass data signals to the pixels of that row, the gate line signal may be deasserted. In a subsequent display frame, the gate line signal for each row may again be asserted to turn on transistor 94 and capture new values of Vp.

Pixel 22 may have a signal storage element such as capacitor 102 or other charge storage elements. Storage capacitor 102 may be used to help store signal Vp in pixel 22 between frames (i.e., in the period of time between the assertion of successive gate signals).

Display 14 may have a common electrode. The common voltage electrode may be coupled to node (terminal) 104 in each of the pixels 22 in array 92. During operation of display 14, the common electrode (which is sometimes referred to as the common voltage electrode, common electrode voltage terminal, common electrode voltage layer, Vcom electrode, or Vcom terminal) may be used to distribute a common electrode voltage such as common electrode voltage Vcom to nodes such as node 104 in each pixel 22 of array 92. As shown by illustrative electrode pattern 104-1 of FIG. 3, Vcom electrode 104 may be implemented using a blanket film of a transparent conductive material such as indium tin oxide, indium zinc oxide, other transparent conductive oxide material, and/or a layer of metal that is sufficiently thin to be transparent (e.g., electrode 104 may be formed from a layer of indium tin oxide, indium zinc oxide, or other transparent conductive layer such as layer 104-1 of FIG. 3 that covers all of pixels 22 in array 92 and that is shorted to terminal 104 in each pixel 22).

In each pixel 22, capacitor 102 may be coupled between nodes 100 and 104. A parallel capacitance arises across nodes 100 and 104 due to electrode structures in pixel 22 that are used in controlling the electric field through the liquid crystal material of the pixel (liquid crystal material 52'). As shown in FIG. 3, electrode structures 106 (e.g., a display pixel electrode with multiple fingers or other display pixel electrode for applying electric fields to liquid crystal material 52') may be coupled to node 100 (or a multi-finger display pixel electrode may be formed at node 104). During operation, electrode structures 106 may be used to apply a controlled electric field (i.e., a field having a magnitude proportional to Vp-Vcom) across pixel-sized liquid crystal material 52' in pixel 22. Due to the presence of storage capacitor 102 and the parallel capacitances formed by the pixel structures of pixel 22, the value of Vp (and therefore the associated electric field across liquid crystal material 52') may be maintained across nodes 106 and 104 for the duration of the frame.

The electric field that is produced across liquid crystal material 52' causes a change in the orientations of the liquid crystals in liquid crystal material 52'. This changes the polarization of light passing through liquid crystal material 52'. The change in polarization may, in conjunction with upper and lower polarizers located respectively above and below the liquid crystal layer of display 14, be used in controlling the amount of light that is transmitted through each pixel 22 in array 92 of display 14 so that image frames may be displayed on display 14.

The transparent conductive film (film 104-1) that is used to form the Vcom electrode of FIG. 3 may have a relatively high sheet resistance. To lower the sheet resistance of Vcom film 104-1, display 14 may be provided with supplemental Vcom lines (sometimes referred to as common electrode voltage lines or common voltage lines) such as lines 104-2 of FIG. 4. Lines 104-2 may be associated with the row of pixels 22 in the pixel array and may run parallel to gate lines G. Lines 104-2 may contact film 104-1 and may be formed from a low resistance material such as copper or other metal to help lower the resistance of the Vcom electrode.

Figure 4:
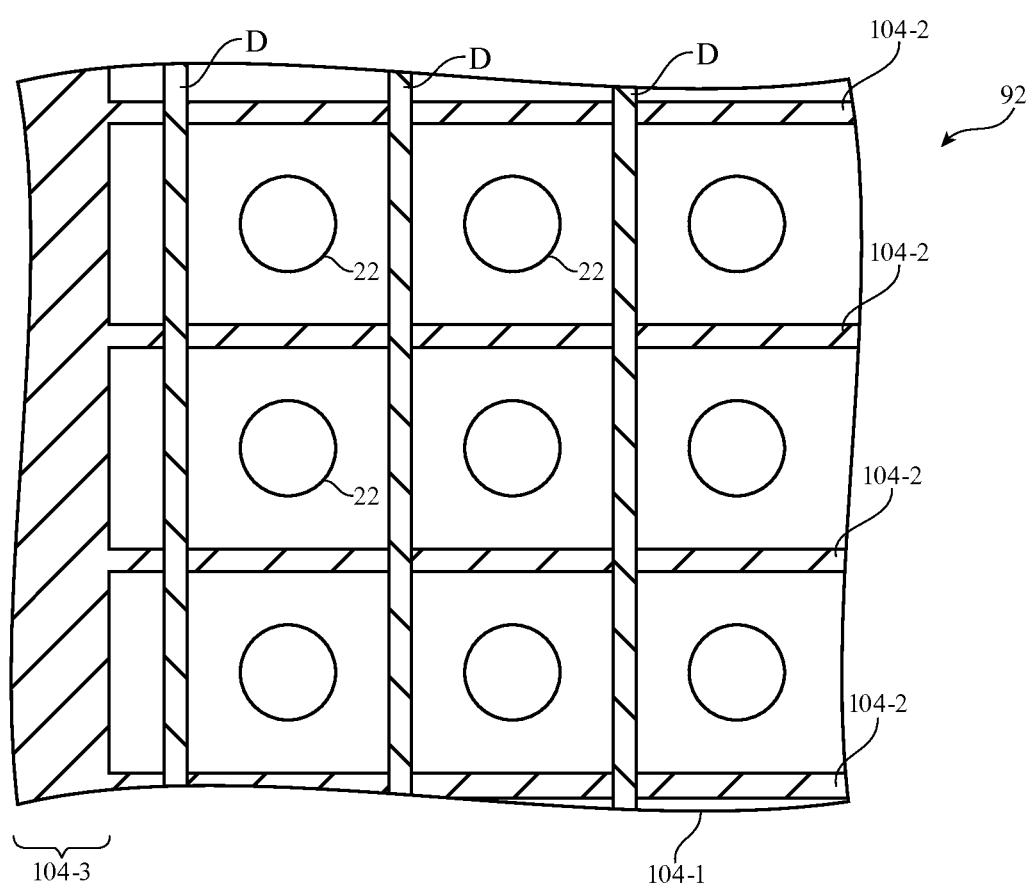
FIG. 4 is a diagram showing how common voltage (Vcom) signals may be distributed to a Vcom electrode formed from a blanket conductive film covering the array of pixels in a display in accordance with an embodiment.

Vertical Vcom paths such as vertical Vcom path 104-3 of FIG. 4 may be used to distribute voltage Vcom to lines 104-2 and film 104-1. There may be paths such as path 104-3 on both the right and left edges of display 14 (as an example). Path 104-3 may be formed from metal (e.g., copper, etc.) and may have a relatively low resistance. With one suitable arrangement, path 104-3 and paths 104-2 may be formed from the same metal layer.

Data lines D overlap Vcom layer 104-1 and, due to an intervening dielectric layer between data lines D and Vcom layer 104-1, this overlap gives rise to a capacitance between Vcom and the data lines. During operation of display 14, as gate lines G are asserted and as data D is being loaded into array 92, voltage ripple may be coupled onto Vcom layer 104-1. The Vcom ripple may have a periodicity of one row time (i.e., Vcom may experience ripple pulses with a duration equal to the time between assertion of successive gate signals on the rows in array 92). The Vcom ripple is a source of undesired noise that can adversely affect display performance.

To minimize Vcom ripple, Vcom compensation circuitry may be coupled to Vcom layer 104-1. The Vcom compensation circuitry may use real time feedback to maintain the voltage on Vcom electrode 104 at a desired level. The voltage Vcom may, for example, be maintained at a fixed DC voltage (e.g., 5 volts) or may be a square wave voltage that varies between a first voltage level (e.g., 0 volts) and a second voltage level (e.g., 8 volts).

The capacitance and resistance of the Vcom electrode may give rise to RC delays that impact the ability of the Vcom compensation circuitry to accurately maintain Vcom at a desired value. To reduce the value of RC for the Vcom compensation circuitry and thereby enhance the accuracy with which the Vcom compensation circuitry can control the value of Vcom (i.e., to help minimize ripple), two or more Vcom compensation circuits may be used along each of the edges of display 14. Each Vcom path may be made up of path segments. The Vcom voltage on each segment may be regulated by a corresponding Vcom compensation circuit. The value of RC that each compensation circuit handles is effectively halved in configurations in which a pair of Vcom compensation circuits are used to control Vcom along a common edge of display 14 or is divided by N in configurations in which N separate Vcom compensation circuits are used to control Vcom along a common edge of display 14. The reduction of load (RC) for each compensation circuit allows each Vcom compensation circuit to be more responsive and to more accurately maintain Vcom at a desired value, thereby helping to minimize Vcom ripple.

Figure 5:
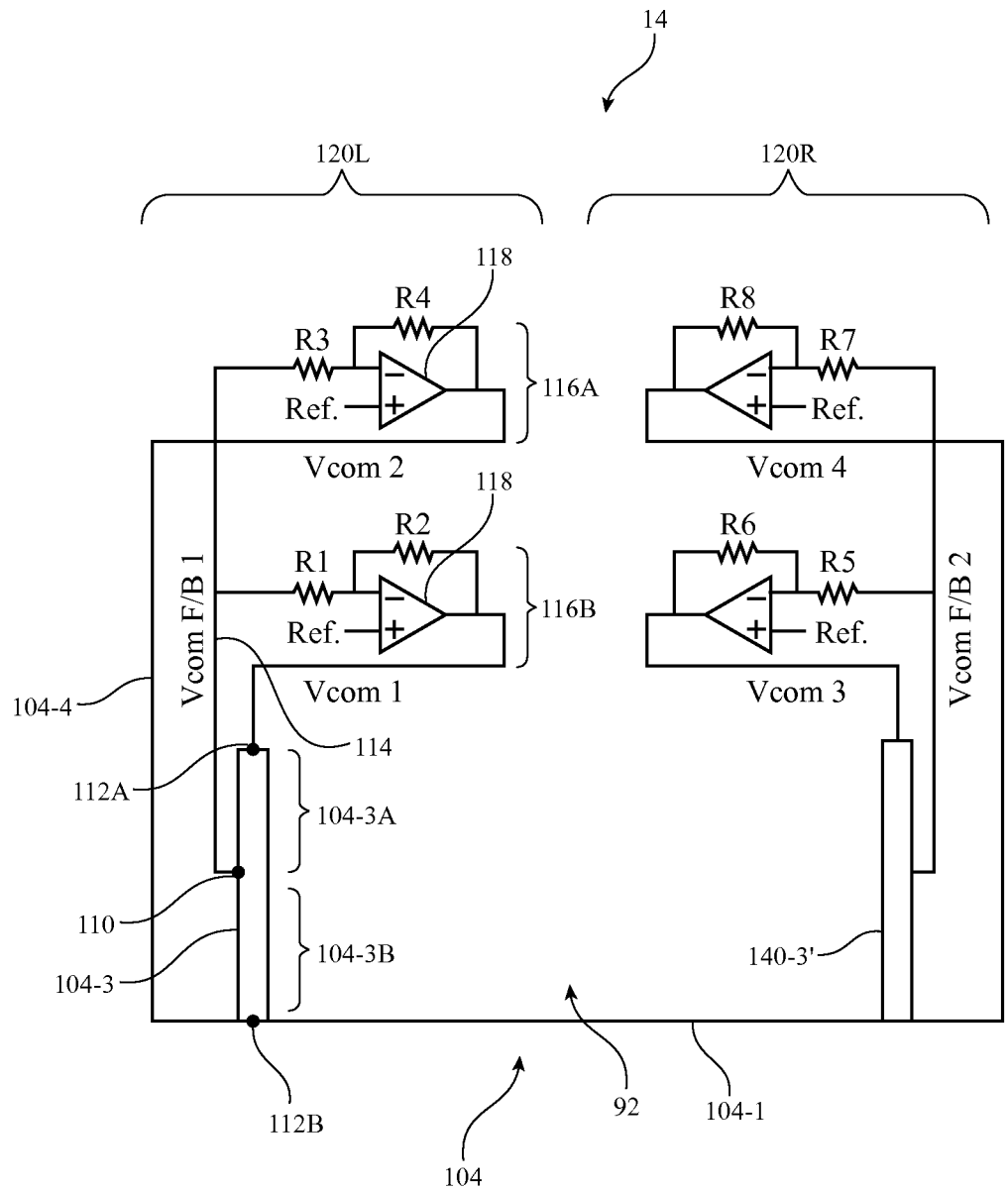
FIG. 5 is a diagram of an illustrative Vcom compensation circuit in accordance with an embodiment.

Consider, as an example, the illustrative Vcom compensation circuit configuration of FIG. 5. As shown in FIG. 5, display 14 may have a left half 120L and a right half 12R. There are two Vcom compensation circuits (circuits 116A and 116B) on left half 120L and two corresponding Vcom compensation circuits on right half 120R. Circuits 116A and 116B are used to control the value of Vcom on Vcom path 104-3. The comparable circuits on right half 120R are used to control the value of Vcom on Vcom path 104-3'. Both paths 104-3 and 104-3' are coupled to Vcom layer 104-1 using horizontal Vcom lines 104-2, as described in connection with FIG. 4. Operation of the left half circuits (circuits 116A and 116B) is described as an example.

Compensation circuits 116A and 116B may be operational amplifier control circuits based on operational amplifiers 118. Each operational amplifier has a positive terminal (+) that receives a reference voltage Ref (i.e., a desired DC or square wave Vcom voltage value or other suitable reference voltage). Each operational amplifier also has a negative terminal (−) that receives feedback (i.e., a Vcom measurement) from Vcom electrode 104 via a corresponding feedback path (path 114 in the example of FIG. 5). The operational amplifier of each compensation circuit determines whether there is any deviation between the measured Vcom value from feedback path 114 and the desired Vcom value (Vcom reference voltage Ref) and, in response, produces a corresponding output to adjust Vcom in electrode 104. For example, if the measured value of Vcom is rising due to a Vcom ripple, the output of the operational amplifiers 118 will be made to fall by a corresponding amount to stabilize Vcom and thereby ensure that Vcom does not deviate excessively from desired voltage Ref.

Path 104-3 may be formed from a layer of copper or other metal on a substrate such as substrate 36 of FIG. 2. Path 104-3 may have a relatively low resistance and capacitance and may be coupled to horizontal Vcom distribution lines 104-2, as shown in FIG. 4. Feedback path 114 may be coupled to node 110 on path 104-3. Node 110 may be located at the midpoint of path 104-3 (e.g., at a location that is at equal distances from the two opposing ends of path 104-3).

The output of compensation circuit 116A (called Vcom2) may be coupled to Vcom control node 112B via path 104-4. The output of compensation circuit 116B (called Vcom 1) may be coupled to Vcom control node 112A. Path 104-3 may include two half segments: segment 104-3A, which extends between feedback node 110 and control node 112A and segment 104-3B, which extends between feedback node 110 and control node 112B. An upper half of Vcom distribution lines 104-2 is coupled to segment 104-3A and a lower half of Vcom distribution lines 104-2 is coupled to segment 104-3A, thereby splitting the RC loading of lines 104-2 and layer 104-1 evenly between segment 104-3A and 104-3B. Because each segment is half of the length of path 104-3 and is loaded by half of layer 104-1 and half of lines 104-2, RC loading is cut in half for each Vcom compensation circuit (as compared to a scenarios in which a single Vcom compensation circuit is coupled to path 104-3).

As a result of dividing path 104-3 into two half segments, compensation circuits 116A and 116B are able to accurately maintain respective segments 104-3A and 104-3B at the desired voltage Ref. The output of circuit 116A that is driven onto node 112B maintains node 112B at Ref due to the operation of the feedback from node 110 on operational amplifier 118 of circuit 116A. Likewise, the output of circuit 116B that is driven onto node 112A maintains node 112A at Ref due to the operation of the feedback from node 110 on operational amplifier 118 of circuit 116B. The pair of Vcom compensation circuits in right half 120R operate in the same way.

Figure 6:
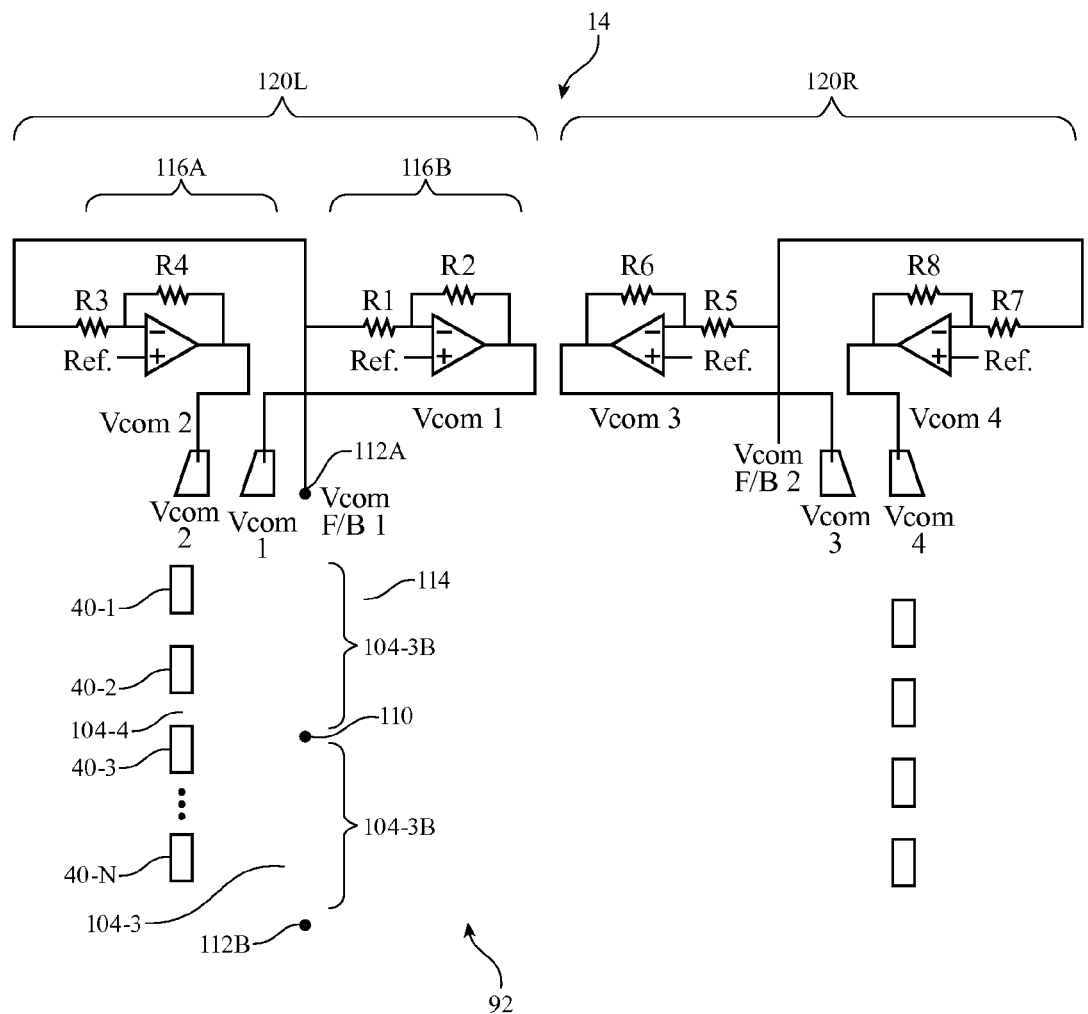
FIG. 6 is a top view of an illustrative display with circuitry of the type shown in FIG. 5 showing how conductive Vcom paths may be arranged on the display in accordance with an embodiment.

FIG. 6 shows an illustrative layout that may be used for the conductive Vcom paths of FIG. 5. As shown in FIG. 6, path 104-4 may be formed from a thin strip of metal that runs down the left hand edge of display 14 in parallel with the thin strip of metal that forms path 104-3. Gate driver integrated circuits 40-1, 40-2, 40-3 . . . 40-N may be mounted along the edge of display 14. If desired, each gate driver integrated circuit may contain an internal signal path that is coupled at either end of that gate driver integrated circuit to path 104-4. In this way, some or all of the signal on path 104-4 may pass through the internal gate driver circuit paths. A metal path that partly or that fully bypasses the gate driver circuits may also be used in forming path 104-4, if desired. An advantage of routing path 104-4 through internal paths in integrated circuits 40-1, 40-2, 40-3, . . . 40-N is that this helps avoid undesired widening of the signal paths on the display substrate (e.g., on the thin-film transistor layer or other substrate 36 on which the Vcom electrode traces are formed). As shown in FIG. 6, feedback path 114 may be formed from a segment of metal that runs parallel to path 104-3, so that upper segment 104-3B of path 104-3 is interposed between path 104-4 and path 114.

Figure 7:
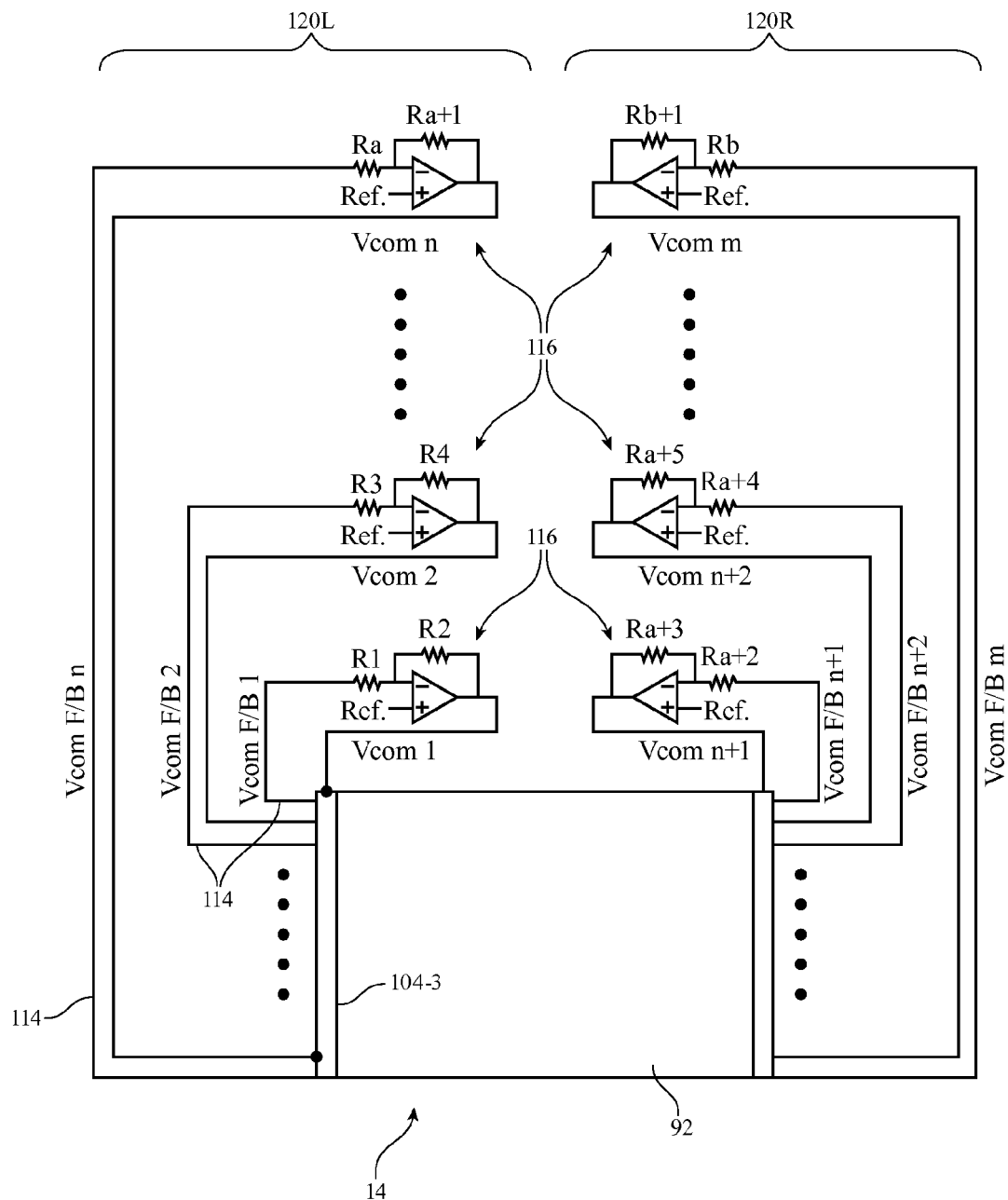
FIG. 7 is a diagram of another illustrative Vcom compensation circuit in accordance with an embodiment.

In the example of FIG. 6, there are two compensation circuits (116A and 116B) in left hand circuit portion 120L and two corresponding compensation circuits on right hand circuit portion 120R. This is merely illustrative. As shown in FIG. 7, there may be three or more Vcom compensation circuits 116 along both the left side and the right side of display 14, each of which maintains the voltage Vcom at a desired reference voltage Ref on a corresponding segment of path 104-3 (and on corresponding segments of path 104-3' on the right side of display 14). In a configuration in which there are N compensation circuits 116 on each side of display 14, the effective segment length of the segments in path 104-3 and the associated loading on each segment is reduced by 1/N (i.e., the RC loading of each segment is reduced to RC/N), thereby helping to ensure that each Vcom compensation circuit can effectively maintain Vcom at a desired voltage level.

If desired, Vcom compensation circuits may be added using single-segment or multi-segment Vcom paths such as path 104-3 and path 104-3' that run along the top and/or bottom edge of display 14 in addition to running along the left and right edges of display 14. The configuration of FIG. 7 in which there is a set of N separate Vcom compensation circuits 116 (each with a corresponding operational amplifier 118) on the left of display 14 and a set of N separate Vcom compensation circuits 116 (each with a corresponding operational amplifier 118) on the right of display 14 is shown as an example.

The foregoing is merely illustrative and various modifications can be made by those skilled in the art without departing from the scope and spirit of the described embodi-

What is claimed is:

1. A display, comprising:
   an array of pixels having first and second opposing edges and third and fourth opposing edges; and
   display driver circuitry that provides data signals to columns of the pixels, and that has gate driver circuitry that provides gate line signals to rows of the pixels, wherein the array of pixels includes a common electrode voltage layer that provides a common electrode voltage to each of the pixels in the array of pixels and includes a first common electrode voltage path that runs along the first edge and a second common electrode voltage path that runs along the second edge, and wherein the display driver circuitry includes first, second, third and fourth common electrode voltage compensation circuits, the first common electrode voltage compensation circuit having an output that is coupled to a first segment of the first common electrode voltage path and the second common electrode voltage compensation circuit having an output that is coupled to a second segment of the first common electrode voltage path, the third common electrode voltage compensation circuit having an output that is coupled to a first segment of the second common electrode voltage path and the fourth common electrode voltage compensation circuit having an output that is coupled to a second segment of the second common electrode voltage path.

2. The display defined in claim 1 wherein the common electrode voltage layer comprises a transparent conductive layer.

3. The display defined in claim 2 wherein the common electrode voltage layer comprises a material selected from the group consisting of: an indium tin oxide layer and an indium zinc oxide layer.

4. The display defined in claim 3 further comprising:
   a plurality of gate lines that provide the gate line signals to the rows of the pixels; and
   a plurality of common electrode voltage lines that run parallel to the gate lines.

5. The display defined in claim 4 wherein the common electrode voltage lines comprise metal lines in contact with the common electrode voltage layer.

6. The display defined in claim 5 wherein the common electrode voltage lines are connected to the first common electrode voltage path that runs along the first edge.

7. The display defined in claim 6 further comprising a feedback path that is coupled between a feedback node on the first common electrode voltage path and the first and second common electrode voltage compensation circuits.

8. The display defined in claim 7 further comprising first and second control nodes that are located at opposing ends of the first common electrode voltage path, wherein the first control node is coupled to the first segment, wherein the second control node is coupled to the second segment, and wherein the feedback node is located at a midpoint of the first common electrode voltage path at equal distances from the first and second control nodes.

9. The display defined in claim 8 wherein the first common electrode voltage compensation circuit comprises a first operational amplifier having a first input terminal coupled to the feedback path, a second terminal coupled to a reference voltage, and an output coupled to the first control node.

10. The display defined in claim 9 wherein the second common electrode voltage compensation circuit comprises a second operational amplifier having a first input terminal coupled to the feedback path, a second terminal coupled to the reference voltage, and an output coupled to the second control node.

11. The display defined in claim 10 further comprising a metal signal path that runs along the first edge in parallel with the first common electrode voltage path.

12. The display defined in claim 11 wherein the gate driver circuitry includes a plurality of gate driver integrated circuits coupled to the metal signal path.

13. The display defined in claim 12 wherein the first segment runs parallel to the feedback path and wherein first segment is interposed between the metal signal path and the feedback path.

14. The display defined in claim 13 wherein the array of pixels comprises liquid crystal display pixels.

15. A liquid crystal display, comprising:
   a rectangular array of pixels having first and second opposing edges and having third and fourth opposing edges;
   a common electrode voltage layer formed from a transparent conductive material that overlaps the rectangular array;
   common electrode voltage metal lines that extend across the common electrode voltage layer parallel to the third and fourth edges;
   a first metal common electrode voltage path that runs along the first edge and that is coupled to the common electrode voltage metal lines along the first edge;
   a second metal common electrode voltage path that runs along the second edge and that is coupled to the common electrode voltage metal lines along the second edge; and
   at least first, second, third, and fourth common electrode voltage compensation circuits comprising respective first, second, third, and fourth operational amplifiers, wherein the first, second, third, and fourth operational amplifiers have respective first, second, third, and fourth outputs, wherein the first metal common electrode voltage path has first and second ends to which the first and second outputs are respectively directly coupled and wherein the second metal common electrode voltage path has first and second ends to which the third and fourth outputs are respectively directly coupled.

16. The liquid crystal display defined in claim 15 wherein the first, second, third, and fourth operational amplifiers each have a reference voltage input.

17. The liquid crystal display defined in claim 16 further comprising:
   a first feedback path that is coupled between a midpoint of the first metal common electrode voltage path and inputs of the operational amplifiers of the first and second common voltage compensation circuits.

18. The liquid crystal display defined in claim 17 further comprising:
   a second feedback path that is coupled between a midpoint of the second metal common electrode voltage path and inputs of the operational amplifiers of the third and fourth common electrode voltage compensation circuits.

19. The liquid crystal display defined in claim 15 further comprising:
   at least a first additional common electrode voltage compensation circuit having an operational amplifier with an output coupled to the first metal common electrode voltage path; and at least a second additional common electrode voltage compensation circuit having an operational amplifier with an output coupled to the second metal common voltage path.

20. A liquid crystal display, comprising:
   a rectangular array of pixels having first and second opposing edges and having third and fourth opposing edges, wherein each pixel has a pixel circuit with a common electrode voltage terminal;
   a common electrode voltage layer formed from a transparent conductive material that overlaps the rectangular array and that is shorted to the common electrode voltage terminals of the pixels;
   common electrode voltage metal lines that extend across the common electrode voltage layer parallel to the third and fourth edges;
   a first metal common electrode voltage path that runs along the first edge and that is coupled to the common electrode voltage metal lines along the first edge;
   a second metal common electrode voltage path that runs along the second edge and that is coupled to the common electrode voltage metal lines along the second edge;
   a first plurality of common electrode voltage compensation circuits each receiving a first common feedback signal from the first metal common electrode voltage path and each providing a common electrode voltage output to a respective segment of the first metal common electrode voltage path; and
   a second plurality of common electrode voltage compensation circuits each receiving a second common feedback signal from the second metal common electrode voltage path and each providing a common electrode voltage output to a respective segment of the second metal common electrode voltage path.

* * * * *